A. ATWOOD.
RAILWAY-WHEEL.
No. 175,321. Patented March 28, 1876.
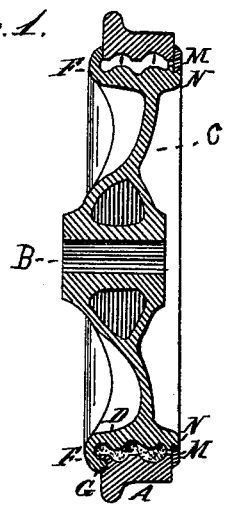
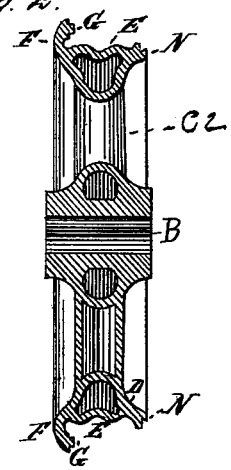
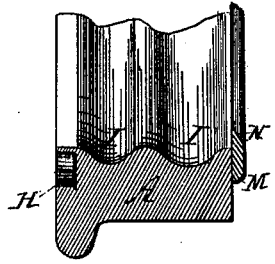
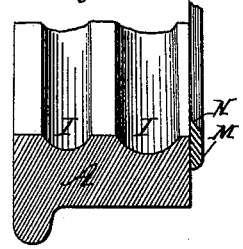
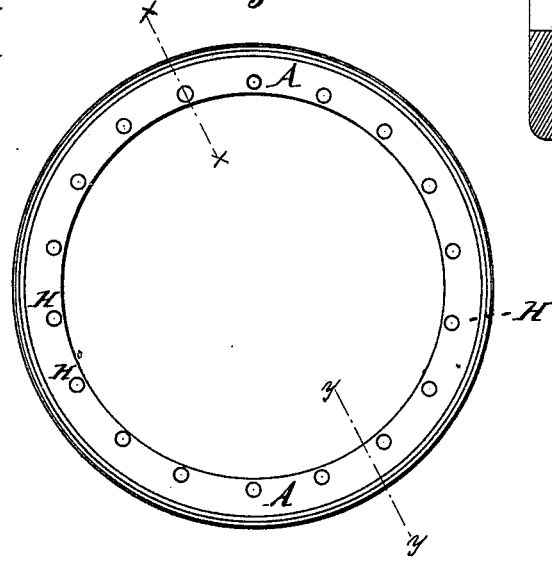
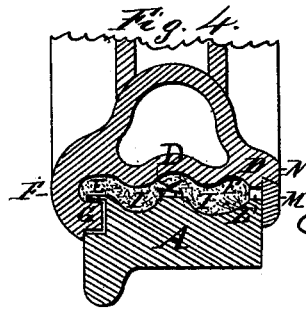
Witnesses
Inventor

UNITED STATES PATENT OFFICE.

ANSON ATWOOD, OF BROOKLYN, ASSIGNOR OF ONE-HALF HIS RIGHT TO ARTHUR B. ROSS, OF NEW YORK, N. Y.

IMPROVEMENT IN RAILWAY-WHEELS.

Specification forming part of Letters Patent No. 175,321, dated March 28, 1876; application filed February 18, 1876.

*To all whom it may concern:*

Be it known that I, ANSON ATWOOD, of the city of Brooklyn, county of Kings, State of New York, have invented a new and useful Improvement in Railway-Wheels, of which the following is a full description, reference being had to the accompanying drawings through the letters of reference marked thereon.

Figure 1 is a cross-section of a wheel, exhibiting its several parts embracing my invention. Fig. 2 is a cross-section of the central portion or body of the wheel, with the tire removed. Fig. 3 represents the back or flange side of the tire. Fig. 4 is a cross-section of the tire and the rim of the wheel, showing a space between them for a packing. Fig. 5 is a cross-section of the tire, Fig. 3, at $x\ x$, which bisects the socket H. Fig. 6 is a cross-section of the tire, Fig. 3, at $y\ y$. Figs. 5 and 6 show different forms of the inner surface of the tire.

My invention has for its object an improvement in the mode of attaching steel or iron tires to the body or central portion of railway-wheels, dispensing with the use of bolts or rivets and the shrinking of the tire upon the central portion or body of the wheel, both of which methods are objectionable, on account of the rigidity of the connection and direct continuity of metallic contact from tread to axle.

My improvement consists in holding in its place a tire upon the central portion or body of the wheel by packing a fibrous material into a chamber formed by the inner corrugated surface of the tire and the outer corrugated surface of the rim of the body of the wheel, without making metallic connection in the line of force of the blows—that is, radially; and the providing a suitable device to prevent the turning or sliding of the tire upon the central portion or body; and, also, by the same device, preventing the tire, in the event of its breaking, from coming off.

My improvement also consists in providing a suitable packing, one that will not become hard and rigid. For that purpose I use hemp, cotton, or other fibrous material, preferably spun into rope of one strand, of about one-half of an inch in diameter, moistened with glycerine—about one pound of glycerine to two of hemp or other fiber. This packing breaks the metallic connection between the tire and the body of the wheel, and it, so to speak, takes up or absorbs the blows, lessening the rapid injury to the rails, and the constant jar, annulling, in a great measure, the rattle and noise in the cars.

I am aware that various attempts have been made to construct car-wheels having leather, rubber, felt, cotton, and wool placed between the tire and the body of the wheel to form a cushion. This kind of packing, as well as the tire on the wheel, has been held to its place on the central portion of the wheel by a binding-ring and bolts or rivets.

My present invention consists in holding the tire to its place upon the body of the wheel by means of the packing, dispensing with a binding-ring and bolts, bolts alone, rivets, or other similar fastenings.

A mode of securing a tire to the body of a wheel was patented by me in Letters Patent dated July 1, 1873, No. 140,339.

It will be readily seen that the present application is for an improvement on the wheel therein described. The tire of that wheel was concave on its inner surface, and the rim had concave spaces on its outer surface, into which oakum was packed.

My improvement is to make two, three, or more cavities in the inner surface of the tire and in the outer surface of the rim of the wheel, all presenting a waved line in cross-section, into which fibrous packing is forced, interlocking and securing the tire firmly upon the central portion or body of the wheel.

My invention consists in a mode of constructing a railway-wheel in two principal parts, one of which is composed of the hub B, the spokes or plates C and $C^2$ connecting the hub and the rim D, in which are cavities E E E, forming a corrugated surface, and presenting a waved line across the rim, as seen in Figs. 1, 2, and 4, and the flange F, on which the pins or lugs G G are cast, which, together, form the central portion or body of the wheel. The second part is the tire and flange. This part is made with two or more cavities, I I, in its inner surface, presenting a waved line in cross-section, and forming a corrugated surface, (A, Figs. 1 and 4,) and on the back or flange side of the tire are the holes or sockets H H for the pins or projections G G. These holes should be a little larger than the pins. The form given to the tire A by the cavities in its inner surface, as shown in Fig. 4, leaves the thickest part of the tire under the central portion of the tread.

Care should be taken in fitting the wheel together. The packing especially should be done in a thorough manner. In the first place the boss outside of the pins G G on the flange F should be turned off to make a perfect fit with the tire, forming what is called a "lead joint," and rendering it water-tight. When the tire is laid upon the flange F the pins G G will enter the holes or sockets H H, which are made a little larger than the pins, so that they should not touch. When the tire is placed on and fitted to the body of the wheel there should be an opening of about one-fourth of an inch at L, Fig. 4, between the tire A and the rim D, through which the packing is to be done. A space is left between the tire A and the rim D, forming an annular chamber, K, Fig. 4, which is larger within than at its orifice L, as seen in Fig. 4, and this chamber K is packed with hemp, cotton, or other fibrous material, forming a cushion, sustaining the whole weight of the load upon the wheel. This packing, which fills the cavities I I in the tire A and the cavities E E in the rim D, interlocks and secures the tire to the body of the wheel without the necessity of using bolts or other fastenings, thus doing away with all metallic connection between the tire and the body of the wheel in the line of force of the blows, the pins or projections G G serving the purposes simply of preventing the tire from turning or sliding around upon the central portion or body of the wheel, or, in case of fracture, from flying off.

The hemp, cotton, or other fibrous material, (hemp-tow will answer, if cleaned,) moistened with glycerine, as stated above, is to be inserted into the chamber K, one strand after another, each being consolidated by packing, using mallets and calking-tools, filling the chamber K piece by piece, and driving each one down as long as any can be forced into the aperture. After the chamber K is perfectly filled with the packing the narrow space L, through which the packing has been done, should be filled with lead or other soft metal to make it water-tight. The edge of the tire is then to be turned off and the dovetail-groove N cut into the rim D, into which groove the ring M is to be shrunk. The office of this ring is to prevent the packing from coming out, and to keep it dry. This ring should be turned off to give it a finish.

The tread of the tire should be turned true and the hub of the wheel bored out at the same time.

The packing, when prepared with glycerine, which does not evaporate and is free from glutinous matter, does not become hard and rigid. I may use paper-pulp, pressing it in by hydraulic pressure. Any such material, when used in a continuous circle to fill a cavity like the chamber K, so formed, as regards its walls, that the packing interlocks or secures the tire upon the central portion or body of the wheel, would be substantially my invention. But I do not make any claim for a packing between the tire and central portion of the wheel for the purpose of forming what is called an "elastic cushion." I make use of packing for the purpose of firmly interlocking and securing a tire to the body of a railway-wheel, preventing, if possible, any movement of the tire; and one of the purposes I have in forming corrugated surfaces on the tire and rim, as described, is to obtain the largest bearing-surface practically possible for the packing.

The corrugated surfaces in the inner surface of the tire and outer surface of the rim of the wheel may be made zigzag, presenting angles more or less obtuse, as the chamber formed by such surfaces can be packed with facility, interlocking and holding the tire upon the central portion or body of the wheel.

As nearly all the wear is upon the tire A, it is evident that I may replace a worn or injured tire by burning out or otherwise removing the packing, and fitting a new tire, thus saving the expense of a new center, which would not, necessarily, be injured.

What I claim, and desire to secure by Letters Patent, is as follows:

1. A steel or iron tire for a railway-wheel, having its inner surface corrugated, and presenting a waved line in cross-section, substantially as described.

2. A body for a railway-wheel, the outer surface of the rim of which is corrugated, presenting a waved line in cross-section, substantially as described.

3. A body for a railway-wheel, having on its rim a flange, F, in combination with the pins or projections G G, substantially as described.

4. The combination of a tire having corrugated inner surface with a rim of the central portion of the wheel having a corrugated outer surface, forming a chamber between said surfaces, substantially as described.

5. A fibrous packing for a railway-wheel, treated with glycerine or its equivalent, substantially as described.

6. A packing of hemp or other fibrous material, when used as an interlocking packing between the corrugated surfaces of the tire and the body of the wheel, substantially as described.

7. A wrought-iron ring shrunk upon and into a dovetail-groove formed upon the central portion or body of the wheel, substantially as described.

8. The combination of a tire, having its inner surface corrugated, with a wheel-body, having the outer surface of the rim corrugated, both presenting a waved line in cross-section, in combination with an interlocking fibrous packing material, for the purpose of holding the tire upon the central portion or wheel-body, substantially as described.

9. A railway-wheel having the tire with its inner surface corrugated, and the central portion or wheel-body, whose rim has its outer surface corrugated, both presenting a waved line in cross-section, forming an annular chamber between the tire and the rim, which chamber is filled with a packing of hemp or other fibrous material, interlocking and securing the tire to the central portion or body of the wheel, in combination with the pins G G and sockets H H, substantially as described.

10. A railway-wheel composed of the following parts: First, a steel or iron tire with its inner surface corrugated, presenting a waved line in cross-section; second, a wheel-body with its corrugated rim, presenting a waved line in cross-section; third, a flange on the wheel-body with pins or projections which prevent the turning or sliding of the tire upon the central portion or wheel-body; fourth, a fibrous packing, which interlocks and secures the tire upon the body of the wheel; fifth, a wrought-iron ring to form a tight joint over the packing, all substantially as described.

ANSON ATWOOD.

Witnesses:
W. S. CALLENDER,
A. MOORE.